United States Patent [19]

Huggins

[11] 4,175,614

[45] Nov. 27, 1979

[54] HEAT EXCHANGER DEVICE

[75] Inventor: Homer D. Huggins, Racine, Wis.

[73] Assignee: Modine Manufacturing Company, Racine, Wis.

[21] Appl. No.: 911,332

[22] Filed: Jun. 1, 1978

[51] Int. Cl.$^2$ ............................................. F28G 13/00
[52] U.S. Cl. .................................. 165/95; 126/299 D; 134/5; 134/105; 219/201
[58] Field of Search ...................... 165/95; 134/5, 105; 126/299 R, 299 D; 219/201

[56] References Cited

U.S. PATENT DOCUMENTS

| Re. 16,807 | 12/1927 | Haber |   |
|---|---|---|---|
| 1,790,205 | 1/1931 | Farmer |   |
| 2,452,367 | 10/1948 | Gangloff | 134/5 X |
| 3,260,189 | 7/1966 | Jensen | 126/299 D |
| 3,827,343 | 8/1974 | Darm | 126/299 D |

Primary Examiner—Albert W. Davis, Jr.
Attorney, Agent, or Firm—Wegner, Stellman, McCord, Wiles & Wood

[57] ABSTRACT

A heat exchanger device for recovering waste heat from a contaminated hot gas that carries solid and precipitable contaminants capable of being liquified by heat. The device has a heat exchanger with a plurality of spaced heat conducting passages for the contaminated hot gas and a plurality of spaced second passages for a cooler second gas with these first and second passages being alternately interleaved for efficient heat transfer and a heat conducting fin in each of the cool gas, such as air, passages for aid in transferring heat between the gases. The disclosure also includes means for selectively applying heat to the outer sides of the heat exchanger for transfer of liquifying heat to the deposited solid contaminants.

6 Claims, 5 Drawing Figures

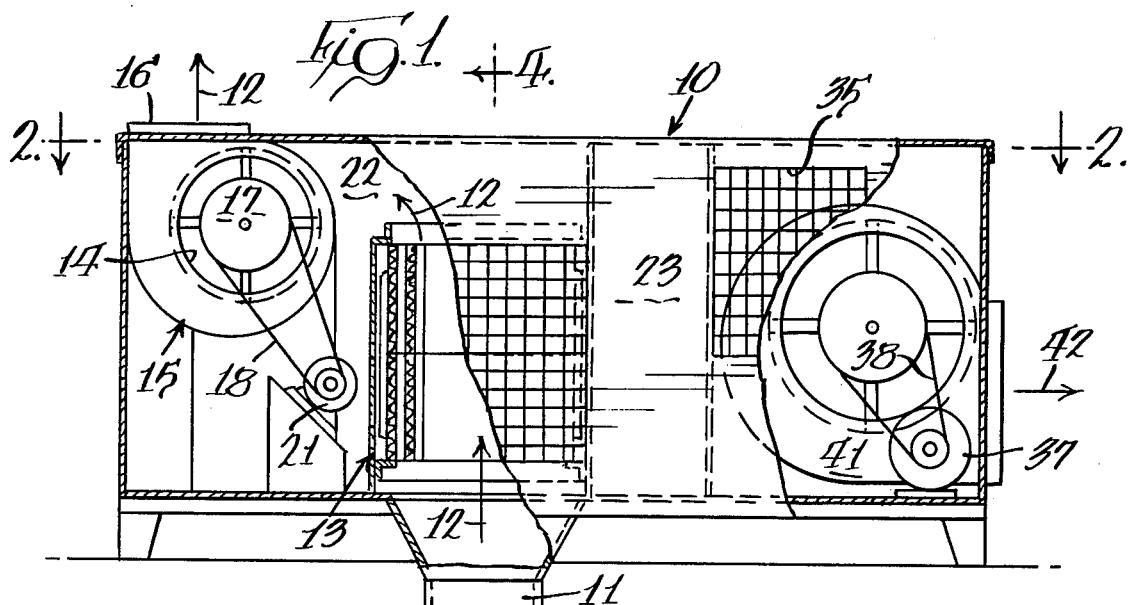
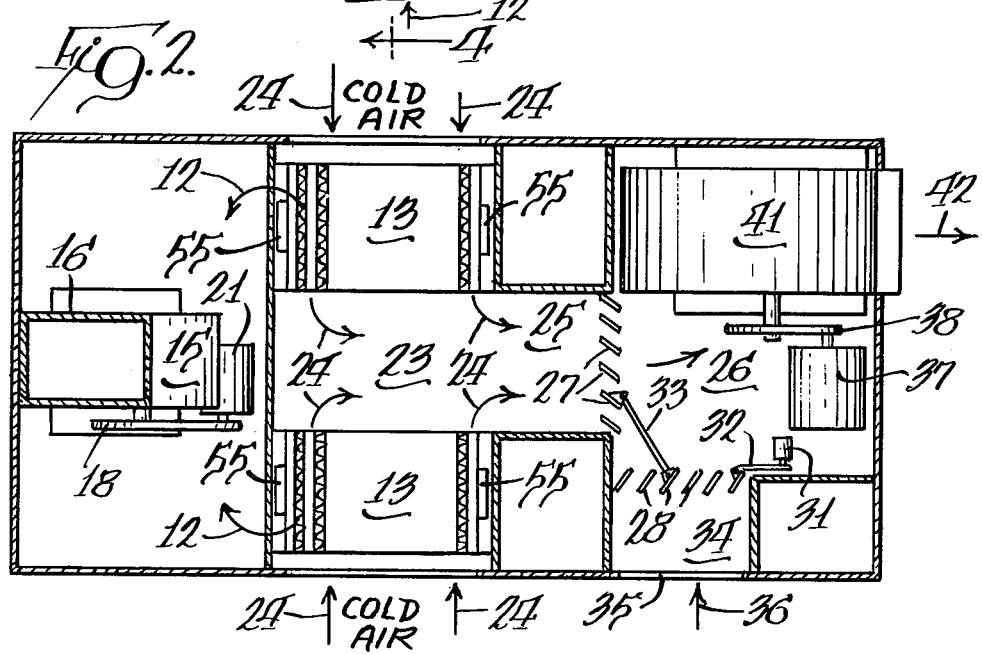
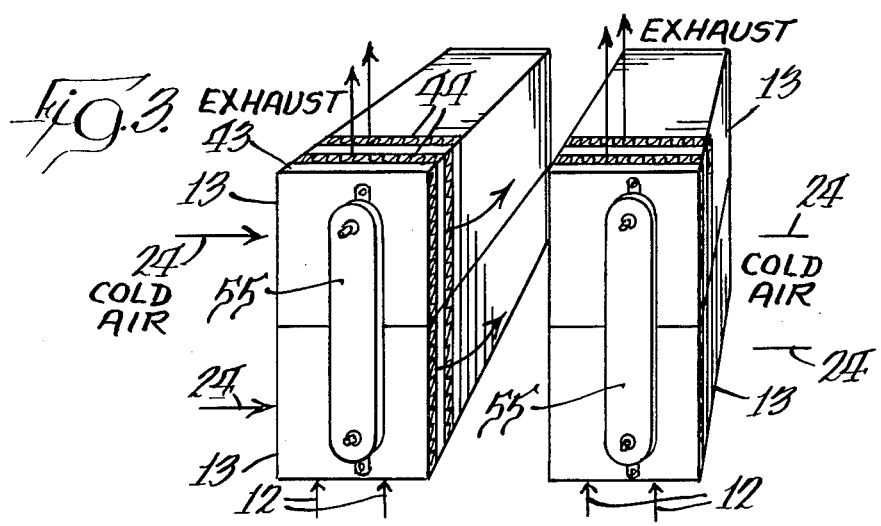

HEAT EXCHANGER DEVICE

BACKGROUND OF THE INVENTION

One of the features of this invention is to provide a heat exchanger device wherein heat in a waste gas that contains precipitable vaporized and entrained solids is conducted to a second cooler gas such as make-up air for a room or the like with the solids being precipitated in the passages of the heat exchanger through which they are conducted. Selectively energizable heating means are provided in heat transmitting relationship with the contaminated gas passages for heat liquifying these contaminants as an aid in their removal such as by gravity flow from the surfaces on which the contaminants are deposited.

The most pertinent prior art of which applicant is aware are the following U.S. Pat. Nos.: Re. 16,807; 1,790,205; 1,805,657; 3,464,224 and 3,827,343. None of these prior art patents disclose the invention features claimed herein.

BRIEF DESCRIPTION OF THE DRAWINGS

FIG. 1 is a side elevational view partially in section of a portion of a heat recovery system for recovering waste heat from a unit such as a fast food installation with this waste heat being recovered for any purpose desired.

FIG. 2 is a sectional view taken substantially along line 2—2 of FIG. 1.

FIG. 3 is a detail perspective view showing four heat exchanger blocks embodying the invention and arranged in pairs as in the illustrated embodiment.

DESCRIPTION OF THE PREFERRED EMBODIMENT

Figure 4:
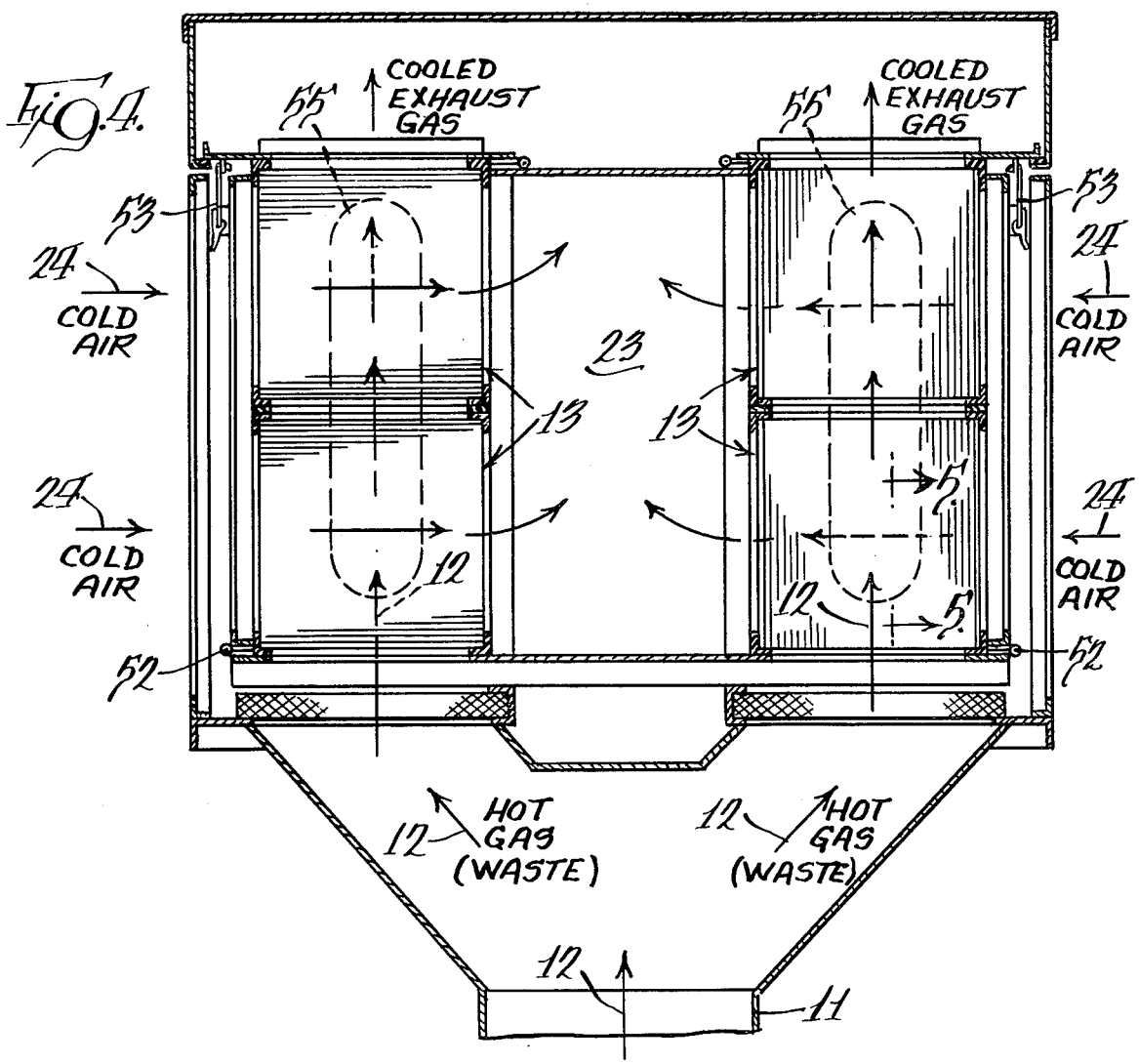
FIG. 4 is a vertical sectional view taken substantially along line 4—4 of FIG. 1.

The heat recovery device 10 illustrated in the accompanying drawings is essentially the same as the one described and claimed in my copending U.S. patent application Ser. No. 765,089, filed Feb. 3, 1977 and assigned to the assignee hereof. As illustrated there the device 10 comprises a first conduit 11 leading from the first heat source which in the embodiment of the above application is a grill or similar cooking space for conducting hot gases 12 from this space to the heat exchanger 13. This gas 12 carries with it vaporized precipitable contaminants such as water, grease and the like together with some entrapped solids, these contaminants being deposited on cool surfaces but capable of being liquified by heat.

From the heat exchanger 13 the gas 12 after being chilled in the heat exchanger passes to the entrance 14 to a blower 15 where it is exhausted from the blower outlet 16 to a place of disposal. This blower 15 has a rotor 17 driven by a belt 18 and motor 21. Thus the blower and its driving system are conventional.

The cooled hot gas 12 on its way to the blower entrance 14 passes through a first plenum chamber 22. The heat recovery device also includes a second plenum chamber 23 for the cold air 24 which may be drawn from the ambient and passes through the heat exchangers 13 in a manner to be described hereinafter for heating this cold air and chilling the entering hot gas to recover heat values therefrom.

From this second plenum chamber 23 the now heated air is conducted as desired either to heat the space in the fast food restaurant or the like or exhausted to a place of disposal.

As shown in FIG. 2 this air 23 after receiving heat values is directed through a passage 25 to a chamber 26 with the flow being controlled by rotatable dampers 27 and 28. Each set of dampers 27 and 28 is rotatable to and from overlapping position by a motor 31 and linkage 32 arrangement with an individual damper 27 and 28 in each set being connected by an arm 33.

The dampers 27 control air flow into the chamber 26 while the dampers 28 control air flow into a chamber 34. This chamber 34 has an opening 35 which may be used to admit recirculated air 36, if desired, as from a room comprising the above-mentioned restaurant, all as described in the above copending application.

The chamber 26 also communicates with the entrance to a blower 41 which also has a rotor rotated by a motor 37 and belt 38 drive. The exhaust from this blower 41 may be directed to any point desired as indicated by the arrow 42.

In the illustrated embodiment an assembly of two pairs of heat exchangers is used for exchanging heat between the hot contaminated gas 12 and the cooler air 24. Each of these heat exchangers comprises a plurality of spaced heat conducting first passages 43 for the contaminated hot gas 12 and a plurality of heat conducting second passages 44 for a cooler second gas such as the illustrated air 24. This air is of course heated by the hot gas to recover heat values therefrom.

Figure 5:
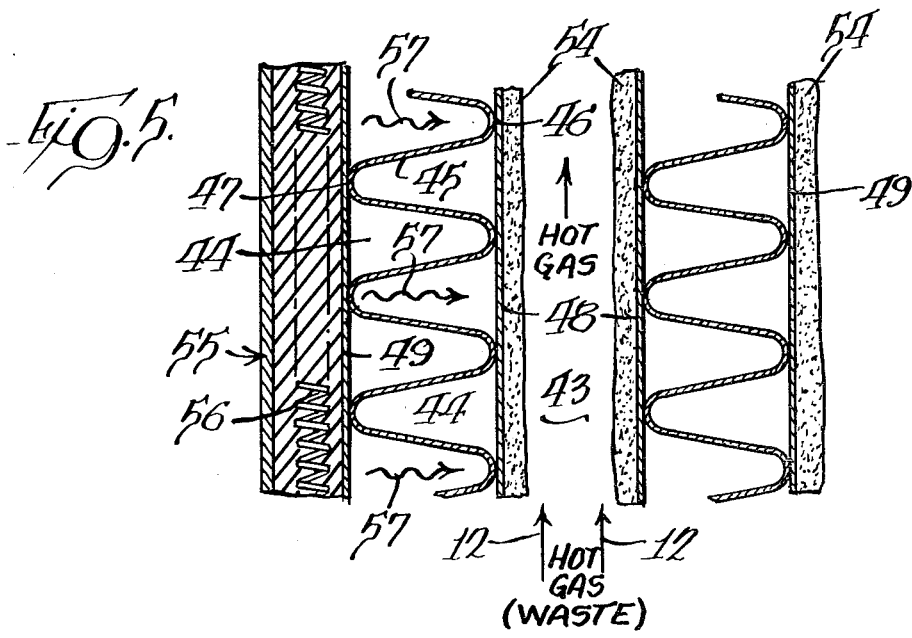
FIG. 5 is an enlarged sectional view taken substantially along line 5—5 of FIG. 4.

These gas passages 43 and air passages 44 are interleaved as illustrated in FIGS. 3 and 5 for efficient heat transfer between the waste hot gas and the cool air that is heated by this waste gas heat.

Each second or air passage 44 contains a heat conducting fin 45 preferably of wide angled convoluted shape having peaks 46 and 47 attached to spaced metal sheets 48 and 49 that in assembly define the cold air passages 44 and the contaminated hot gas passages 43. Heat exchangers of this type as well as the hinge 52 and buckle 53 mounting therefor are described and claimed in the copending application of D. C. Granetzke Ser. No. 758,129, filed June 10, 1977 now U.S. Pat. No. 4,095,646 and assigned to the assignee hereof.

During the passage of the contaminated hot gas 12 through the hot gas passages 43 the contaminants such as grease, water and entrained solids which are temperature sensitive tend to be deposited on the sides of the metal sheets 48 defining the passages 43 in layers illustrated at 54. These of course tend to restrict and in certain cases even block the flow of gas 12 through these passages. This is particularly true in extremely cold weather when the heat exchange gas 24 is air drawn in from the ambient.

Although the heat exchanger blocks 13 are illustrated as being removable from their supporting frames by the provision of the hinge mounting 52 and the buckle type clamps 53 there may be times when such removal cannot be readily accomplished for cleaning the blocks. This can occur of course on very cold days when water or grease in the waste gas 12 collects and condenses in the layers 54 and they can actually be frozen solid particularly over a cold night.

In order to provide for cleaning the heat exchangers under these extreme conditions strip electric heaters 55 are provided against the ends of the heat exchanger 13 as illustrated in FIGS. 3-5. These heaters which contain the resistance elements 56 may be energized as desired and heat is conducted through the metal parts as indicated by the arrows 54 to heat and melt the deposited contaminants.

In order to provide for ready removal of the melted contaminants the passages 43 are arranged at an incline to the horizontal, here shown as vertically arranged, for gravity flow of the resulting heat liquified contaminants from within the heat exchanger. Thus in the illustrated embodiment the first or hot gas passages 43 are arranged generally vertically while the second or cold air passages 44 are arranged horizontally at right angles to these first passages.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A heat exchanger device for recovering waste heat from a contaminated hot gas that carries solid and precipitable contaminants capable of being liquified by heat, comprising: a heat exchanger having a plurality of spaced heat conducting first passage means therethrough for said contaminated hot gas and a plurality of spaced heat conducting second passage means therethrough for a cooler second gas to be heated by heat exchange with said hot gas, said first passages and said second passages being interleaved for efficient heat transfer between the two gases; a heat conducting fin in each of said second passages for aid in transferring heat between said gases, each said fin comprising means for providing gas flow paths for said second gas, said interleaved first and second passages being defined at their sides by heat conducting sheets common to both passages on which the contaminants are deposited from said contaminated hot gas on the said first passages surfaces of said sheets; and means for applying heat to said sheets that define the outer extremities of the outermost said second passages for heat transfer by way of said fins to the sheets defining said first passages in order to heat liquify contaminants deposited thereon.

2. The device of claim 1 wherein there are provided mounting means for said first passages arranging said passages inclined to the horizontal for gravity flow of said contaminants following said liquifying by heat.

3. The device of claim 1 wherein said fins are serpentine metal sheets having spaced convolutions providing gas flow paths in said convolutions.

4. The device of claim 1 wherein said first passage means are generally vertical and said second passage means are generally horizontal.

5. The device of claim 4 wherein said fins are serpentine metal sheets having spaced convolutions providing gas flow paths in said convolutions.

6. The device of claim 1 wherein said means for applying heat comprise flat electrical resistance heaters of large area in intimate surface contact with said sheets that define said outer extremities of the outermost said second passages.

* * * * *